US007934160B2

(12) United States Patent
Bono et al.

(10) Patent No.: US 7,934,160 B2
(45) Date of Patent: Apr. 26, 2011

(54) SLIDE KIT CREATION AND COLLABORATION SYSTEM WITH MULTIMEDIA INTERFACE

(75) Inventors: Charles A. Bono, Gwynedd Valley, PA (US); Ross E. Dworkin, Springfield, PA (US)

(73) Assignee: Litrell Bros. Limited Liability Company, Dover, DE (US)

( * ) Notice: Subject to any disclaimer, the term of this patent is extended or adjusted under 35 U.S.C. 154(b) by 644 days.

(21) Appl. No.: 11/779,982

(22) Filed: Jul. 19, 2007

(65) Prior Publication Data
US 2008/0028314 A1    Jan. 31, 2008

Related U.S. Application Data

(60) Provisional application No. 60/820,925, filed on Jul. 31, 2006.

(51) Int. Cl.
*G06F 3/00* (2006.01)
*G06F 3/048* (2006.01)

(52) U.S. Cl. ........ 715/732; 715/753; 715/754; 715/756; 715/758

(58) Field of Classification Search .................. 715/732, 715/731, 727, 719, 723, 233, 230, 730, 751, 715/753, 754, 756, 758; 709/204
See application file for complete search history.

(56) References Cited

U.S. PATENT DOCUMENTS

| | | | | |
|---|---|---|---|---|
| 5,749,908 | A * | 5/1998 | Snell | 607/30 |
| 6,396,500 | B1 * | 5/2002 | Qureshi et al. | 345/473 |
| 6,546,405 | B2 * | 4/2003 | Gupta et al. | 715/233 |
| 6,587,945 | B1 * | 7/2003 | Pasieka | 713/176 |
| 6,738,075 | B1 * | 5/2004 | Torres et al. | 715/723 |
| 7,257,769 | B2 * | 8/2007 | Caspi | 715/233 |
| 7,346,656 | B2 * | 3/2008 | Worthen | 709/204 |
| 7,373,590 | B2 * | 5/2008 | Woolf et al. | 715/230 |
| 2002/0075572 | A1 * | 6/2002 | Boreczky et al. | 359/722 |
| 2003/0086682 | A1 * | 5/2003 | Schofield et al. | 386/46 |
| 2003/0105820 | A1 * | 6/2003 | Haims et al. | 709/205 |
| 2003/0204490 | A1 * | 10/2003 | Kasriel | 707/2 |
| 2003/0231198 | A1 * | 12/2003 | Janevski | 345/704 |
| 2004/0218904 | A1 * | 11/2004 | Yoon et al. | 386/69 |
| 2005/0031296 | A1 * | 2/2005 | Grosvenor | 386/4 |
| 2005/0120127 | A1 * | 6/2005 | Bradley et al. | 709/231 |
| 2006/0026502 | A1 * | 2/2006 | Dutta | 715/511 |
| 2006/0067578 | A1 * | 3/2006 | Fuse | 382/190 |
| 2006/0184872 | A1 * | 8/2006 | Dontcheva et al. | 715/512 |

(Continued)

OTHER PUBLICATIONS http://office.microsoft.com/en-us/word/HA011426511033.aspx, Keep up with changes to shared projects, as early as May 7, 2009.
http://office.microsoft.com/en-us/powerpoint/HP030701181033.aspx, Subscribe to be notified of changes to a file or discussion, as early as May 7, 2009.
http://office.microsoft.com/en-us/outlook/HP010524771033.aspx, About managing alerts received from a SharePoint site, as early as May 7, 2009.
http://office.microsoft.com/en-us/powerpoint/HA011232031033,aspx?pid=CL100626991033, Tracking project changes, as early as May 7, 2009.

(Continued)

*Primary Examiner* — Tadeese Hailu
(74) *Attorney, Agent, or Firm* — Perkins Coie LLP

(57) ABSTRACT

A slide kit creation system and method allows reviewers of a slide kit to insert non-textual comments, such as audio comments, to be associated with selected slides. In one embodiment, audio comments are transmitted to a host computer by telephone, and may be posted on the host computer for access by other reviewers. The audio comments may also be transcribed in text form. In another embodiment, comments may be associated with various portions of a video, in the same manner. A video navigation bar is coded to indicate which portions of the video are associated with comments. Alternatively, certain attributes of the video can be altered to indicate the presence of comments associated with specific scenes of the video.

34 Claims, 11 Drawing Sheets

U.S. PATENT DOCUMENTS

| | | | |
|---|---|---|---|
| 2006/0184980 A1* | 8/2006 | Cole | 725/88 |
| 2006/0190250 A1* | 8/2006 | Saindon et al. | 704/235 |
| 2006/0253542 A1* | 11/2006 | McCausland et al. | 709/207 |
| 2006/0294468 A1* | 12/2006 | Sareen et al. | 715/730 |
| 2007/0100939 A1* | 5/2007 | Bagley et al. | 709/204 |
| 2007/0100986 A1* | 5/2007 | Bagley et al. | 709/224 |
| 2007/0245243 A1* | 10/2007 | Lanza et al. | 715/723 |
| 2007/0271338 A1* | 11/2007 | Anschutz | 709/204 |
| 2007/0282948 A1* | 12/2007 | Praino et al. | 709/204 |
| 2008/0028323 A1* | 1/2008 | Rosen et al. | 715/752 |
| 2009/0196570 A1* | 8/2009 | Dudas et al. | 386/52 |
| 2009/0268886 A1* | 10/2009 | Balentine et al. | 379/88.18 |
| 2010/0199182 A1* | 8/2010 | Lanza et al. | 715/723 |

OTHER PUBLICATIONS

Web Page entitled "Upload Video, Collaborate Online, Launch your own tv station", from www.mediasilo.com, Jul. 9, 2007.

Microsoft PowerPoint 2003 Example created Feb. 24, 2010.

U.S. Appl. No. 11/087,404, filed Jan. 6, 2010, Office Action.

U.S. Appl. No. 11/087,404, filed May 19, 2010, Office Action.

U.S. Appl. No. 11/422,445, filed Feb. 26, 2010, Office Action.

U.S. Appl. No. 11/422,445, filed Jun. 23, 2010, Office Action.

U.S. Appl. No. 11/442,445, filed Sep. 1, 2010, Advisory Action.

* cited by examiner

FIG. 3

Transcriber Page

Transcriptions to be downloaded

| Filename | size | Type | Date | uploaded | DNYet |
|---|---|---|---|---|---|
| Adsfasfddas | 400 | mp3 | 5/5/2006 | y | |
| nbnbbddas | 300 | mp3 | 5/6/2006 | n | |

Logout

Download next file

Upload transcribed file

FIG. 5

Transcriber upload screen

Sound files downloaded

| Filename | Date |
|---|---|
| Adsfasfddas | 5/6/2006 |
| Nbnbbddas | 5/7/2006 |

Transcriptions uploaded

| Filename | Count | Line |
|---|---|---|
| Adsfasfddas | 450 | |

Number of lines

Browse..

Select File:

Upload a File

FIG.6

SLIDE KIT CREATION AND COLLABORATION SYSTEM WITH MULTIMEDIA INTERFACE

CROSS-REFERENCE TO PRIOR APPLICATION

Priority is claimed from U.S. provisional patent application Ser. No. 60/820,925, filed Jul. 31, 2006, the disclosure of which is incorporated by reference herein.

BACKGROUND OF THE INVENTION

This invention relates to the field of information management. The invention provides a system and method for creation and modification of slide kits. Such slide kits are used in presentations given for educational purposes, or presentations given for marketing of products or services, or other contexts. The invention also includes a system and method for editing of video content.

Slides are frequently used in the delivery of oral presentations, whether in academic environments, in business, or in other environments. The term "slide" originally referred to a translucent photographic film that would move ("slide") into position in a projector, for viewing on a screen. Modern technology has largely replaced the old photographic slide by a computer-generated image that is projected onto a screen.

Modern "slides" are typically created by known software programs, such as PowerPoint (the term PowerPoint is a trademark of the Microsoft Corporation, of Redmond, Wash.). The images created by these programs are still called "slides", even though they are not photographic, and do not physically "slide" through anything.

In this specification, the term "slide" is used in its most general meaning, to include both conventional photographic slides, as well as computer-generated images. Indeed, in this specification, the term can refer to any display of information, whether the display is static or moving (such as a video), provided that display can be handled as a unit, and placed in a series containing other similar or dissimilar units.

A set of slides (a "slide kit") is typically created and edited by a plurality of persons located in geographically disparate places. The same is true for the creation and editing of a video. Examples of systems and methods which facilitate collaboration among persons in the creation and editing of slide kits are given in U.S. patent application Ser. No. 11/087,404, filed Mar. 23, 2005, and published as US 2006-0236246 A1, and U.S. patent application Ser. No. 11/422,445, filed Jun. 6, 2006, and published as US 2006-0218004 A1. The disclosures of both of the above-cited applications are incorporated by reference herein.

The present invention comprises improvements over the systems and methods described in the above-cited applications.

The above-cited applications describe systems and methods which save time by reducing the number of redundant comments received from participants in the slide kit creation and editing process, by organizing such comments and requested changes, and by implementing a formal approval process while documenting all comments and changes made to the slides.

A primary component of the above-described systems is a display screen which shows the contents of a slide kit, one slide at a time, to reviewers, to give the reviewers the opportunity to comment on the slides. The comments can take the form of text, images, or other reference material. The present invention enables the collaborators to include multimedia content, such as audio and other content, during the editing process. The invention also provides a collaborative method for editing a video.

SUMMARY OF THE INVENTION

The present invention comprises a method of creating a slide kit, wherein a plurality of reviewers submit comments relating to specific slides in the kit. In one embodiment of the invention, the reviewer submits a comment by audio transmission technology, such as by telephone, by voice-over internet protocol (VOIP), or even through a microphone directly connected to a computer. The comment is stored as an audio file, on a host computer, accessible to other reviewers through a link posted on the host computer. The audio file may be transcribed by a human transcriber, and the transcribed file may also be made available to the reviewers. The invention also includes a system for implementing the above-described method. Thus, the host computer is programmed to execute the above-described method, using a network connection (such as the Internet) to establish connections with the reviewers. The host computer may also be programmed to notify reviewers of the existence of comments, made with respect to particular slides, by other reviewers.

Another embodiment of the invention relates to a method and system for creation and editing of a video. In this embodiment, instead of selecting static slides to be commented upon, a reviewer selects a key frame, shown on a screen display, and the portion of the video associated with the selected key frame is played for the reviewer. The reviewer can then submit comments relating to the displayed portion of the video, either in text form, or in a non-text form, such as by transmission of an audio comment or image. The system makes the comments available to all reviewers. The system may also be programmed to notify reviewers when other reviewers have commented upon particular portions of the video. Non-textual comments submitted by the reviewer can be transcribed and made available to all reviewers.

In the latter embodiment, the system also provides a video navigation bar which is coded to indicate the portions of the video which have comments associated therewith. In another variation, the system may vary an attribute of the video display to indicate the portions of the video having comments. For example, the video could be displayed with a tint or overlaid color, when the displayed portion or scene has been associated with a comment.

Navigation through the video is aided by the display of key frames. A key frame can be defined as a representative frame (such as the first frame) from each scene of the video. Alternatively, a key frame could be defined as a representative frame (such as the first frame) from each scene of the video having comments associated therewith.

The present invention therefore has an object of providing a system and method for creation and editing of a slide kit.

The invention has the further object of enabling reviewers, who are collaborating on the creation of a slide kit, to submit non-textual comments, such as audio comments, relating to selected slides of the kit.

The invention has the further object of enabling reviewers of a slide kit to have quick access to the audio comments made by other reviewers with respect to particular slides.

The invention has the further object of facilitating the cooperation of a plurality of reviewers, who may be in disparate geographical locations, in the creation of a slide kit.

The invention has the further object of facilitating the cooperation of a plurality of reviewers, who may be in disparate geographical locations, in the creation of a video.

The invention has the further object of enabling reviewers of a video to view comments submitted by other reviewers, with respect to selected portions of the video.

The invention has the further object of enabling reviewers of a video to approve comments submitted by other reviewers, with respect to selected portions of the video.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 3 provides a diagram showing a display screen, used in the present invention, as seen by a reviewer while the reviewer is adding an audio comment.

FIG. 5 provides a diagram showing a display screen, used in the present invention, as seen by a transcriber of the audio comments.

FIG. 6 provides a diagram showing a display screen, used in the present invention by a transcriber to upload transcribed comments to a desired location.

DETAILED DESCRIPTION OF THE INVENTION

Figure 1:
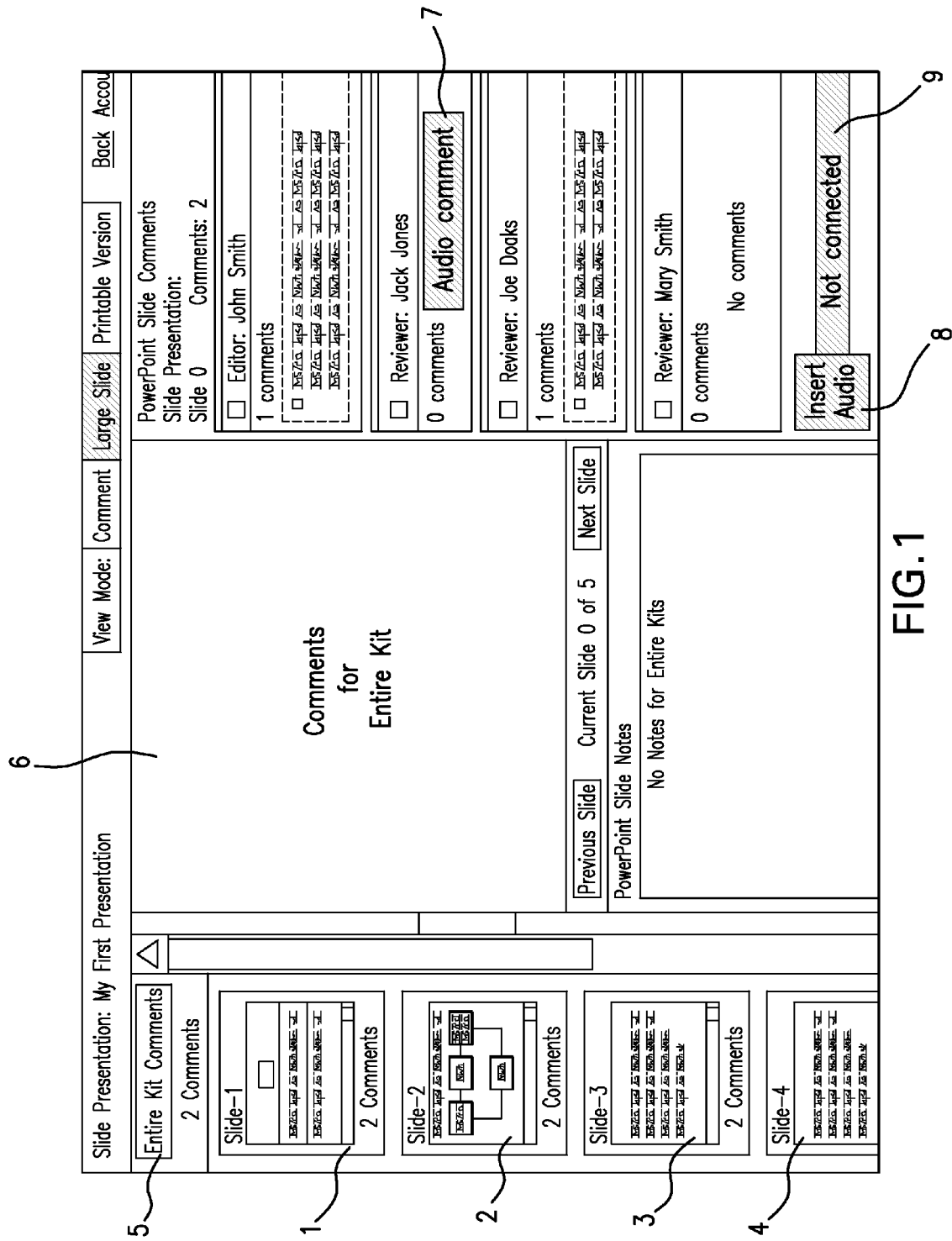
FIG. 1 provides a diagram showing a display screen, used in the present invention, which gives a reviewer the opportunity to insert an audio comment.

In one embodiment, the present invention comprises a slide collaboration system, similar to those described in the above-cited references, in which the users can insert multimedia content. That is, the users can add comments to the slides, using formats other than text. In the examples described below, the comments are audio files which are transmitted by telephone. The comments could instead be photographs, videos, or any multimedia materials. In general, the present invention can thus be described as a method for adding comments, in multimedia formats, to a slide kit.

In the example where the comments are in audio form, the system offers the reviewer, i.e. the person reviewing the slides, the opportunity to connect to the system by telephone. The user can then transmit an audio record simply by speaking into the telephone.

Although the user may initially be required to call into the system and enter a user ID and password, the present embodiment is distinguished by the fact that, when the user wishes to enter an audio comment, the system can be programmed to telephone the reviewer. Such calling is made feasible by the advent of VOIP technology.

In using the invention to add an audio comment, the reviewer clicks on a button labeled "Insert Audio", and is asked to verify (or change, if permitted by the system) the previously stored telephone number at which the reviewer is to be reached. The system then telephones the reviewer. Once the telephone connection is made, the reviewer can then record the comment. During the recording process, the reviewer has access to such recording functions as "Start recording", "Re-record", "Rewind", "Pause", and "Stop". The reviewer may be provided with online audio editing features. After the reviewer has completed the comment, he or she can disconnect, or can remain connected to record additional comments.

When reviewing the recording made, the user can listen to the audio either on the telephone or through the computer.

Another element of the invention is the ability to insert audio material into an existing audio track, assuming that the reviewer has permission to do so. Specifically, when the reviewer is listening to the audio comment of a colleague, the reviewer can click "insert" during the recording, at which point the reviewer can record his or her comments, and then can click "stop" when finished.

The existing audio file will then be tagged to indicate the presence of embedded comments, and during playback, at the appropriate point, the system will announce "inserted by . . .", indicating the name of the commenter, and the date and time of insertion of the comment. At the conclusion of the added audio comment, the system will provide a message such as "insertion completed".

The insertion of audio comments into an audio file can be accomplished in at least two different ways. First, one could split the original audio file into two segments, and during playback, one could switch from the original first segment to the inserted comment, and then one could switch back from the inserted comment to the next segment of the original file. Secondly, one could recreate the original audio file to include the audio insert, so that there is only one audio file which includes the insert.

Although the above examples deal with audio files, the user could upload virtually any multimedia file, including photographs, diagrams, videos, etc. The system would insert the multimedia file in a similar way to what has been described above.

The invention, as described so far, has at least the following uses:

1. The system can call into a live conference, to provide access to the audio comments associated with each slide. Moreover, those experts who cannot participate in the live conference can listen to the discussion later, and can insert comments where appropriate. This process provides flexibility and convenience in conducting live slide reviews.

2. The system can be used to transmit and review a lecture. The lecturer can provide the lecture, in audio form, using this system, with reference to slides, since the audio comments provided by the lecturer could comprise the lecture. Later, others can review the lecture, and can insert audio comments. The entire process can later be transcribed to produce a single, more polished lecture.

3. The system can be used to aid in the efficient creation of a slide presentation. In this embodiment, the user uploads a slide kit, and then "speaks" to each slide, i.e. inserts comments associated with each slide. The system can then automatically generate a synchronized slide presentation in a standard format.

4. The system can be used for diagnostic and other expert commentary. The slides could be X-rays, for example, and the radiologist could provide an audio comment for each slide.

5. The system can be used to create an online debate. A blog, such as one dealing with economics, politics, etc., could play a speech, and critics could listen to that speech and insert opposing points of view, in audio form, at appropriate times.

The user of the system of the present invention may submit the entire slide kit, with the associated comments, for transcription. Access to the site would then be provided to a transcriber, who could be located virtually anywhere, for preparation of a written transcript. If it is desired to keep the content of the slide kit and comments confidential, the system can divide the audio file associated with each slide into several files, and can make these audio files available separately, possibly even to different transcribers. Then, when the transcription is uploaded to the system, the system can assign the transcribed content to the appropriate slide.

FIG. 1 illustrates a typical screen display, as seen by a reviewer who is given the opportunity to insert an audio comment to a slide forming part of a slide kit. The contents of the slide kit are shown, in thumbnail form, as images 1, 2, 3, and 4, on the left-hand column. Only four such images are visible in FIG. 1, but a scroll bar provides access to other images of slides in the kit. Clicking on one of these thumbnail images causes the selected slide to be displayed, in a large format, in central display area 6. The left-hand column also includes a block 5, labeled "Entire Kit Comments", which provides a display of the written comments received so far for the entire kit. In the example shown, the user has clicked on block 5, so that the comments for the entire kit are shown in central display area 6. The user can also navigate through the kit by clicking on the "Next Slide" or "Previous Slide" buttons, below the central display area.

The legend "PowerPoint Slide Notes", shown below the central display area, refers to notes which may be part of the slide itself, when the slide is first created. Such notes are not to be confused with comments on slides made by the reviewers. When the reviewer clicks on a thumbnail image of a particular slide, in the left-hand column, and that slide is displayed in the central display area, any notes associated with the slide are simultaneously displayed in the area below the central display area. In the example represented in FIG. 1, the reviewer has selected "Entire Kit Comments", which is a choice for which there would be no notes.

The right-hand side of the display comprises blocks identifying the various reviewers, or other participants, in the slide kit creation and editing process. In the example shown, "John Smith" is an editor who has provided one written comment, displayed symbolically under his name. Another written comment has been supplied by a reviewer named "Joe Doaks", and the comment is displayed below the name. "Jack Jones" is a reviewer who has posted an audio comment, available by clicking on button 7. "Mary Smith" is a reviewer known to the system, but who has not yet posted any comments.

To insert an audio comment, the reviewer clicks on button 8, labeled "Insert Audio". Box 9 indicates the status of the system, i.e. whether or not the reviewer is currently connected, by telephone, to the system, for transmittal of an audio comment. At the moment represented by FIG. 1, the reviewer has not yet clicked button 8, and therefore box 9 indicates that the reviewer is "not connected" to the host system.

Figure 2:
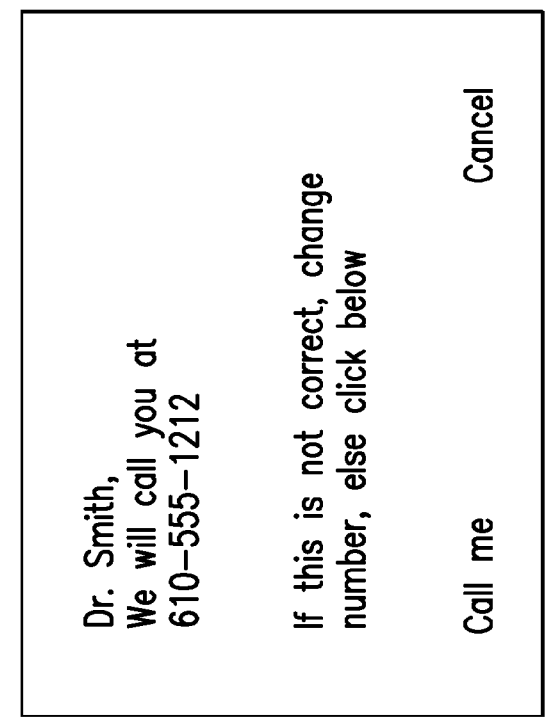
FIG. 2 provides a diagram showing a hypothetical display screen in which the system of the present invention verifies the telephone number of a reviewer who wishes to insert an audio comment.

After the reviewer clicks on the "insert audio" button, the system responds with the display shown in FIG. 2. Specifically, the system verifies the name and telephone number of the reviewer, giving the reviewer the option to authorize the system to make contact by telephone. The system then places the telephone call to the reviewer.

Figure 3:
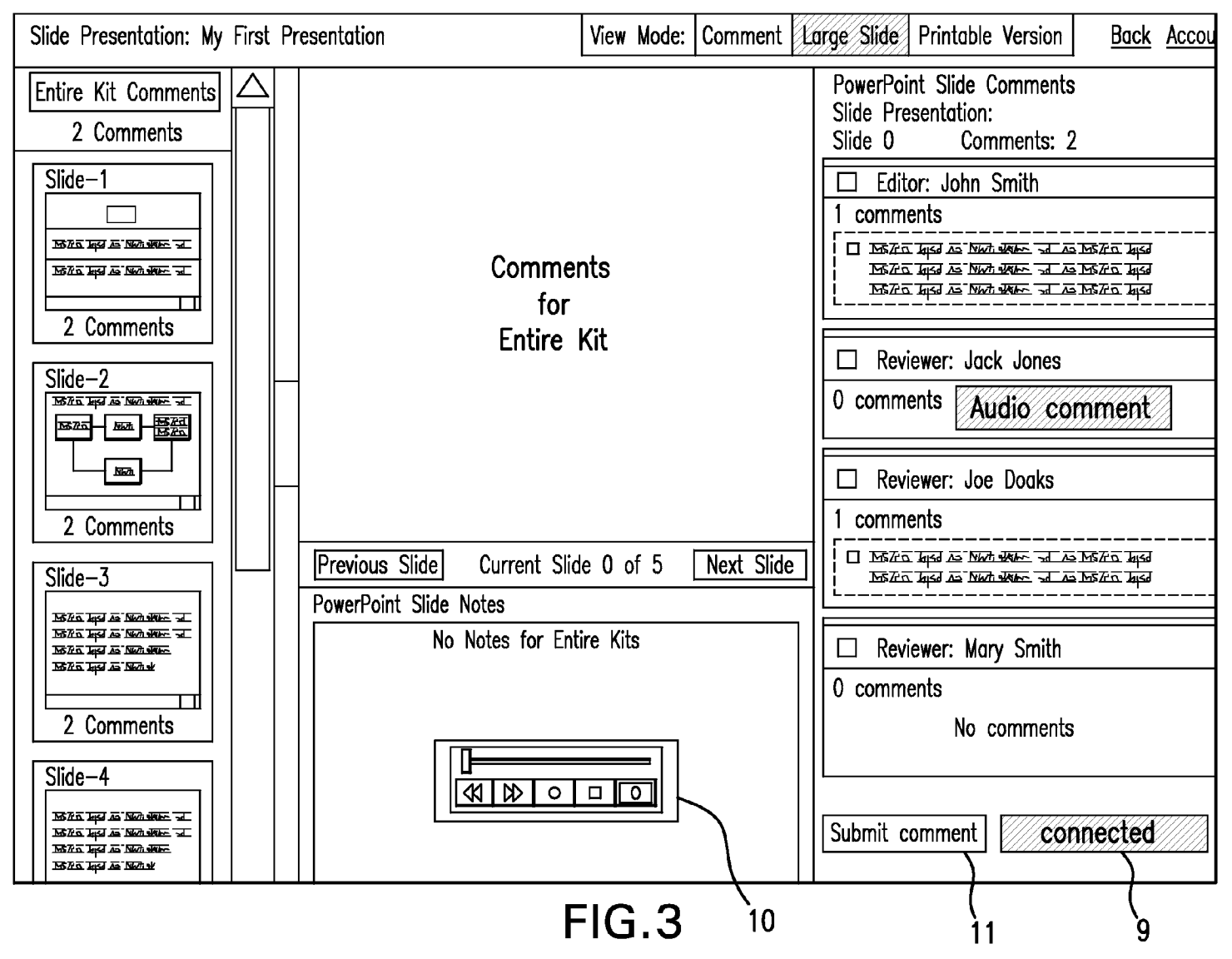

FIG. 3 illustrates the display screen while the reviewer is speaking. Note that box 9 now indicates that the system is connected by telephone to the reviewer. The reviewer speaks into the telephone, and when finished, can either simply submit the comment, by clicking on the "Submit Comment" button 11, or re-record the comment. The "submit comment" button has replaced the "insert audio" button. The controls in block 10 enable the reviewer to navigate through the audio comment, before that comment has been submitted. The audio comment is automatically associated, by the system, with the slide which has been selected for display in the central display area.

The arrangement provided in the examples represented in FIGS. 1-3 can be modified, within the scope of the invention. For example, instead of replacing the "insert audio" button with the "submit comment" button, the system could display both buttons, possibly with one or the other greyed out.

Suppose now that the reviewer has just logged onto the system, and wishes to listen to, and possibly comment on, an audio comment previously submitted by another reviewer. The right-hand column of FIG. 1 shows one such audio comment, namely the one provided by the reviewer Jack Jones. The reviewer clicks on button 7 to listen to that comment. Box 9 would still indicate that the system is not connected, because when the reviewer is simply listening to a comment, there is no active telephone connection between the system and the reviewer.

Figure 4:
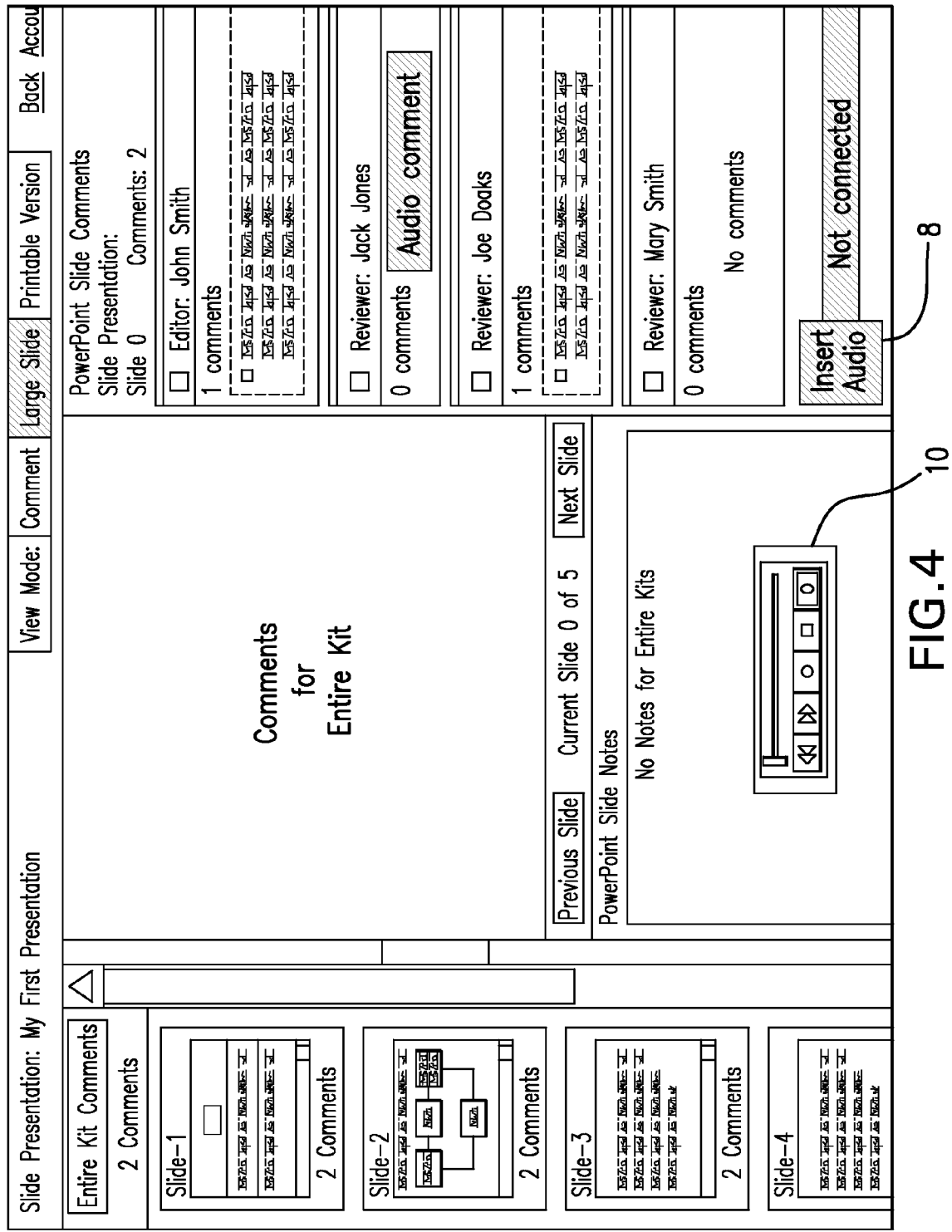
FIG. 4 provides a diagram showing a display screen, used in the present invention, as seen by a reviewer who is listening to the audio comment of another reviewer.

FIG. 4 illustrates the display as it would appear while the reviewer listens to the selected audio comment. Block 10 appears on the screen, to provide audio controls. If the reviewer wants to insert audio comments relating to the selected comment, the reviewer clicks on button 8, and the system connects to the reviewer as described above. The reviewer can then provide the comment by speaking into the telephone.

Another feature of the present invention concerns notification of reviewers about comments on slides. In one embodiment, the system is programmed to notify each reviewer who has commented on a particular slide, when another reviewer has commented on that slide. The notification is preferably performed by email. That is, the system sends an email to all reviewers who have commented on the slide in question, the email containing a link to the comment, to that slide, submitted by the other reviewer. The system can send multiple emails, or a single email containing multiple links, to alert the reviewer about all comments made by other reviewers to that particular slide.

The notification of reviewers could also be performed in other ways, such as by telephone, or through an online interface.

In another embodiment, the system can be programmed to notify all reviewers who have viewed a particular slide, concerning the existence of one or more comments to that slide. That is, in this alternative, a reviewer who has reviewed a slide would receive notification of comments even when he or she has not submitted a comment to that particular slide. The notification would be performed in the same manner as described above.

FIG. 5 illustrates a typical display screen as seen by a transcriber. The transcriber logs into the system, and is presented with a display as shown. In this example, the transcribers download audio files from different parts of different presentations, to enhance security. The display shows the files available, identified by file name, size, type, and date of creation. The display also indicates, to the transcriber, whether a transcribed version of the original file has been uploaded yet. In the final column, the display indicates whether the file has been downloaded yet.

To download an audio file, the transcriber can either click on the file name, or can click the "Download next file" button. The file being downloaded could be transmitted in a batch form, or it could be streamed to the transcriber. When the transcriber has created a transcript of the downloaded file, the transcript can be uploaded to the system by clicking on the "Upload transcribed file" button.

After multiple transcribers transcribe all of their audio files, and have uploaded them to the host system, the system will match each transcript to the proper slide.

FIG. 6 shows the transcriber upload screen. Among other things, this screen insures that the name of the uploaded Word document matches the name of the downloaded audio file. The transcriber is given the opportunity to select a file for uploading, by browsing through the contents of a local hard drive, and to upload the file. The display shows which files have been downloaded, and which files have been uploaded, by the transcriber.

The present invention can be practiced with or without the step of transcription. It is possible to provide the audio comments solely in audio form, accessible only by clicking on the appropriate button. The step of transcription enables the reviewers to see the comments in textual form as well. Thus, the invention comprises providing comments, in either or both of audio and textual form.

FIGS. 7-10 illustrate an embodiment of the invention which enables a group of persons to collaborate on the creation and editing of a video. In particular, according to the invention, each participant has access to the video being edited, with standard controls for viewing (i.e. fast forward, rewind, play, pause, stop). While viewing the video, each participant can add comments to specific portions of the video. Also, each participant, while reviewing the video, will see the comments, inserted by others, with respect to identifiable portions of the video.

Sections of the video which contain at least one comment are indicated by shading along the video location bar. The shading can be designed to indicate how many comments have been associated with the portion of the video. For example, light shading of a segment of the video location bar can indicate the presence of a single comment, and dark shading could indicate the presence of two or more comments.

To navigate through the video, the left-hand column of the display screen can contain one of at least two possible types of thumbnail images. In one case, the thumbnail images represent "key" frames, such as the first frame of a scene. In another case, the thumbnail images represent scenes of the video with which comments are associated.

Figure 7:
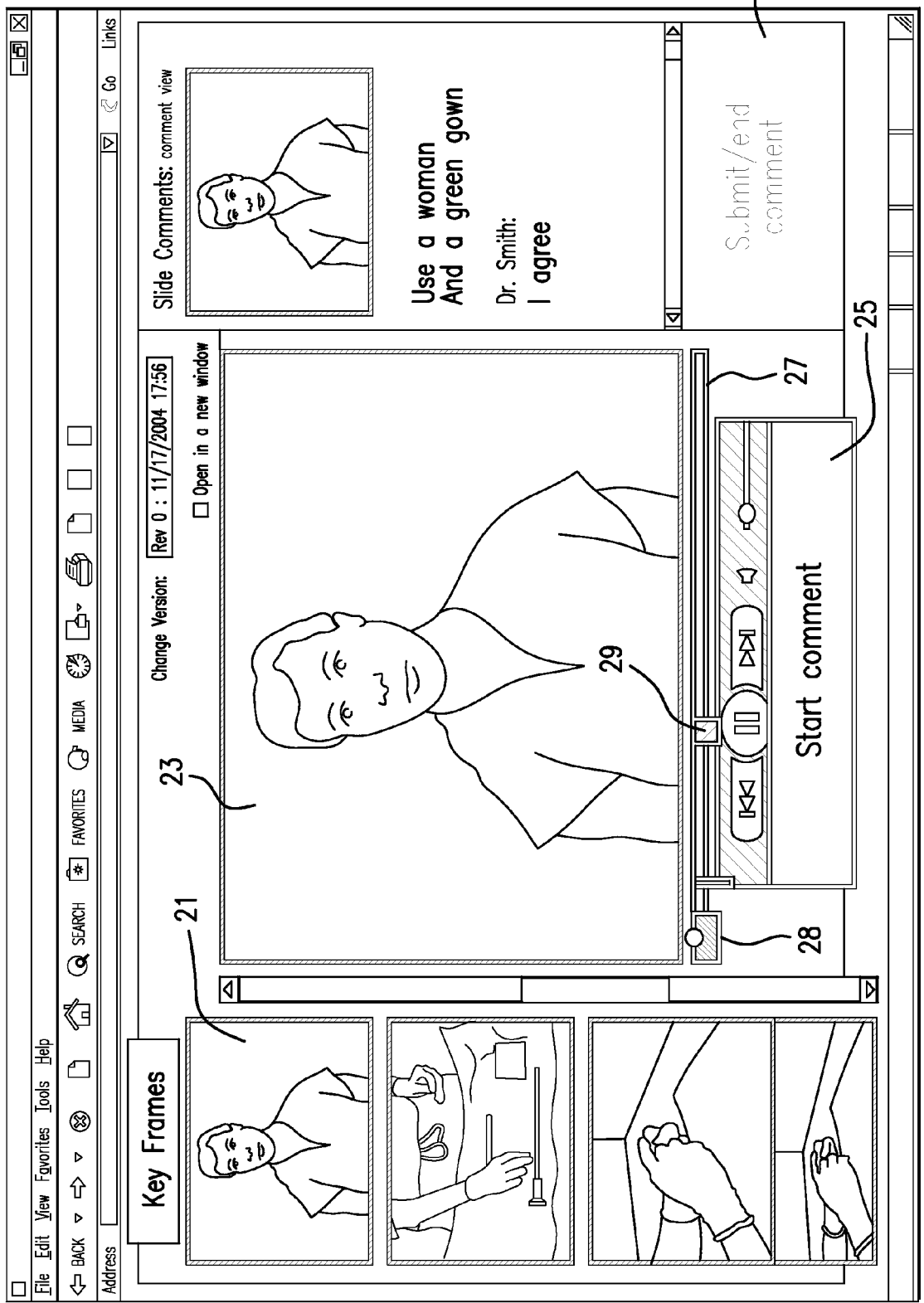
FIG. 7 provides a diagram showing a display screen, used in the present invention, to enable a reviewer to insert comments pertaining to a video.

FIG. 7 illustrates a typical screen for use by a reviewer of a video. Key frames of the video are shown in the left-hand column. Existing technology can be used to identify automatically the first frame of each scene. That is, the software for identifying the first frame of each scene of a video is commercially available, and does not, by itself, form part of this invention.

In the example of FIG. 7, the reviewer has clicked on frame 21, and therefore the scene represented by this frame is what is shown in central display area 23. Note, however, that what is shown in the central display area will be moving, since the object being edited is a video, not a collection of static images. The central display area will show the scene from the video which has been selected by clicking on a key frame in the left-hand column. Button 25 is used by the reviewer to start to dictate a comment, and button 26 is used to indicate that the comment is complete, and is ready to be sent to the host computer. FIG. 7 represents a point at which the reviewer has not yet started a comment. Therefore, button 25 is presented in full, and button 26 is greyed out. That is, one cannot designate the completion of a comment when a comment has not yet been initiated.

Video navigation bar 27 indicates the portion of the video being viewed at any given moment. Standard video controls (i.e. fast forward, rewind, etc.) are provided in the vicinity of the video location bar. Shaded areas 28 and 29 identify portions of the video which are associated with comments. As noted above, a light shading, such as that shown in area 29, could be used to indicate the presence of only one comment. A darker shading, such as that shown in area 28, could be used to indicate the presence of more than one comment. Other schemes for identifying the types of shaded areas could be used, within the scope of this invention. In general, the invention includes coding of the video navigation bar to indicate portions of the video with which comments have been associated.

Written comments pertaining to the selected scene are shown in the right-hand column. Thus, in the example of FIG. 7, one reviewer has suggested replacing the man in the scene with a woman in a green gown. Another reviewer has indicated agreement with this suggestion.

In the example shown, the comment submitted is in written form. But, in general, the comments could take the form of written comments, or an audio file, or other media. If the comments have the form of an audio file, for example, a link to the audio file would be provided on the screen in exactly the same manner as shown in FIGS. 1, 3, and 4.

Figure 8:
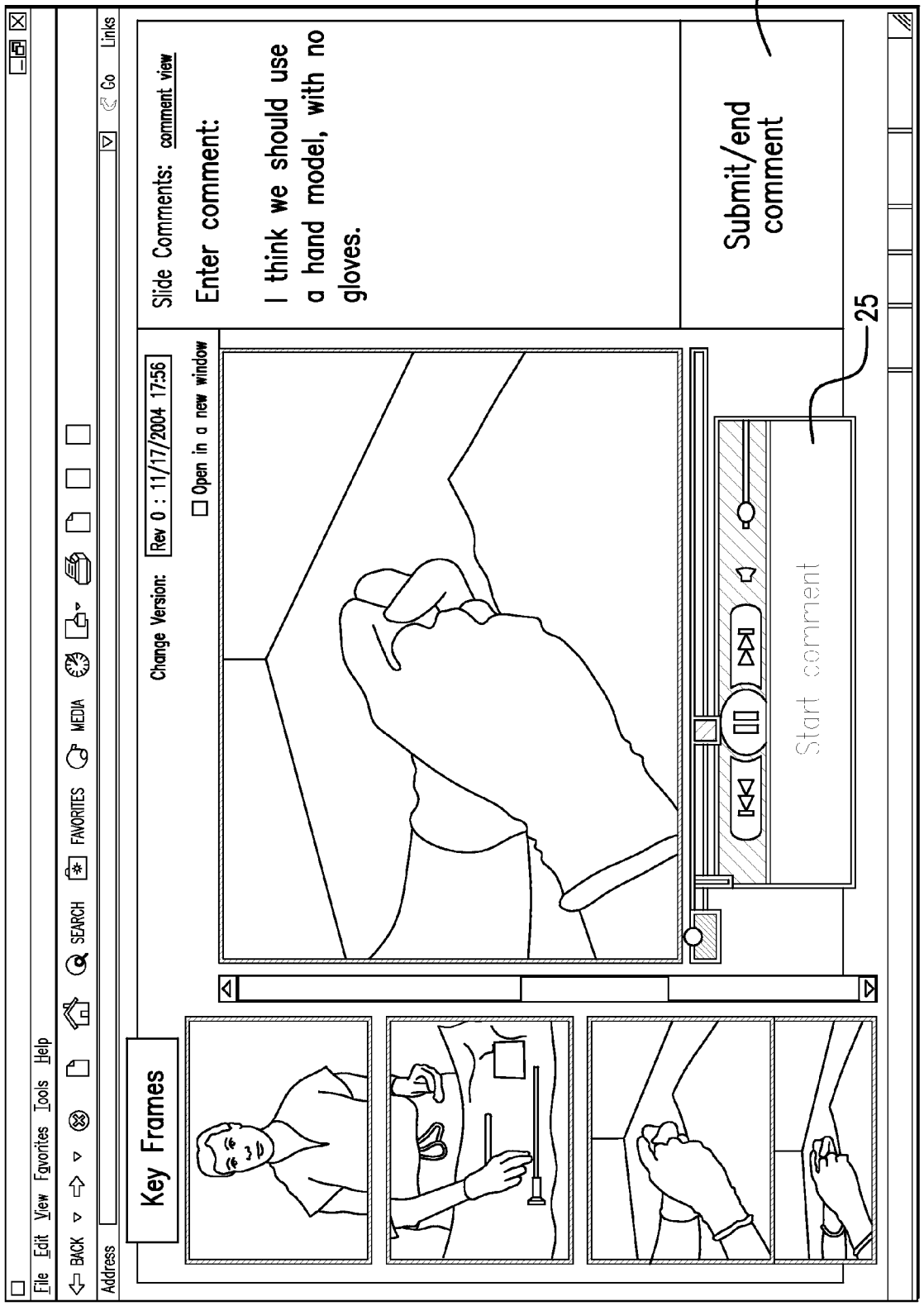
FIG. 8 provides a diagram showing a display screen, used in the present invention, representing the insertion of a comment, by a reviewer, to a section of a video.

In FIG. 8, the reviewer is adding a comment to the selected portion of the video. Thus, the "Start Comment" button 25 is greyed out, while the Submit/end comment button 26 is shown in full. In the example given, a reviewer has commented that the video should use a hand model with no gloves.

Figure 9:
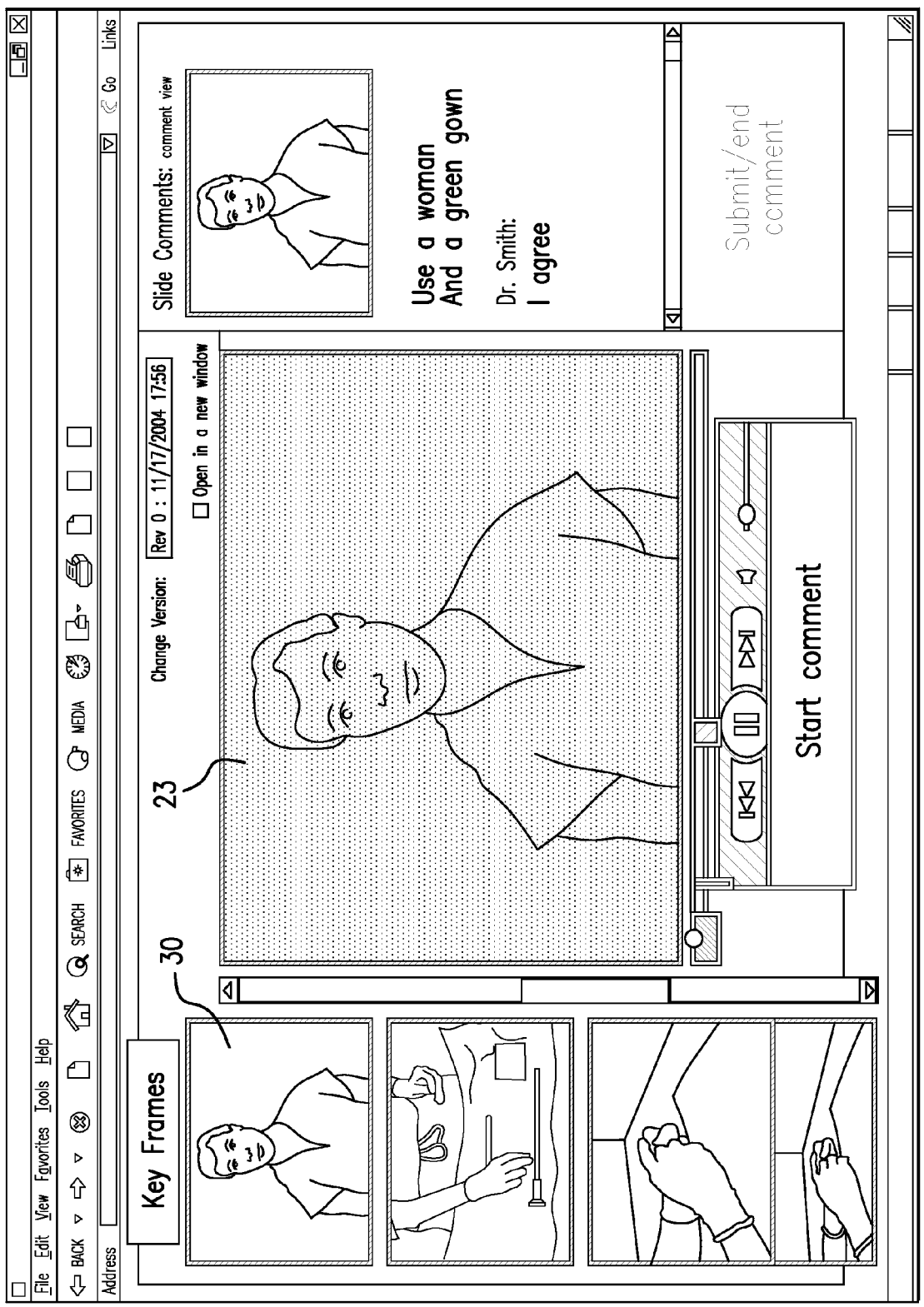
FIG. 9 provides a diagram showing a display screen, used in the present invention, illustrating the coding of portions of a video to indicate, to a reviewer, where the comments are located.

FIG. 9 illustrates the feature wherein portions of the video with which comments are associated are indicated by alteration of the main video display. Thus, in this example, the central display area 23 has a tint, or colored overlay, or the like, during portions of the video having associated comments. This color or tint preferably remains on the video for the duration of the segment of the video for which there are associated comments. The tint is provided on the central display area only. Note that the portion of the video being shown in the central display area corresponds to the scene represented by the thumbnail image 30 at the top of the left-hand column. In general, other attributes of the video could be altered to indicate the presence of a comment.

Figure 10:
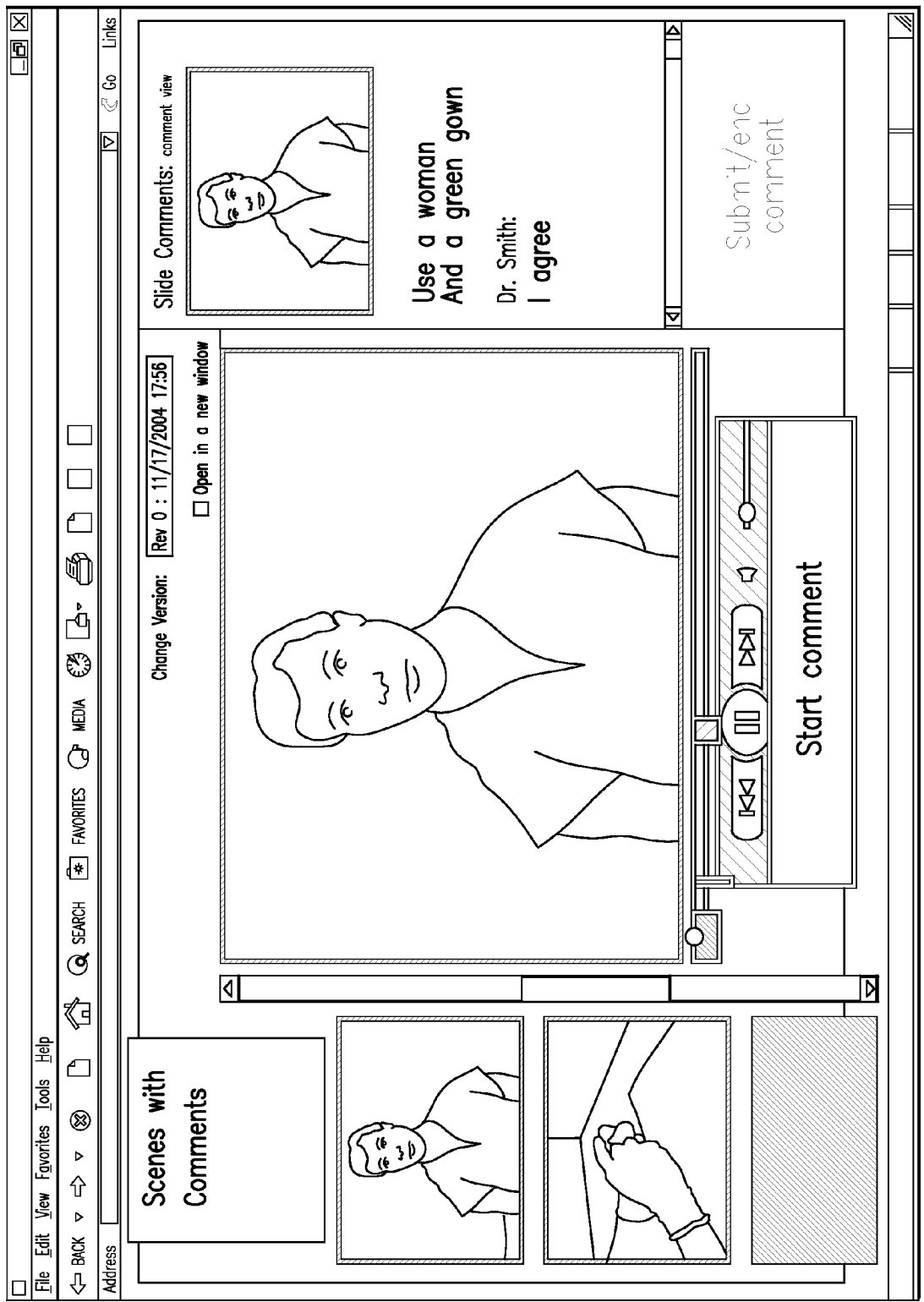
FIG. 10 provides a diagram showing a display screen, used in the present invention, illustrating how the system indicates which scenes of a video contain comments submitted by a reviewer.

FIG. 10 is similar to FIG. 9, except that FIG. 10 relates to the variation wherein the thumbnail images in the left-hand column relate not to the beginning of each scene, but instead identify scenes having associated comments.

Figure 11:
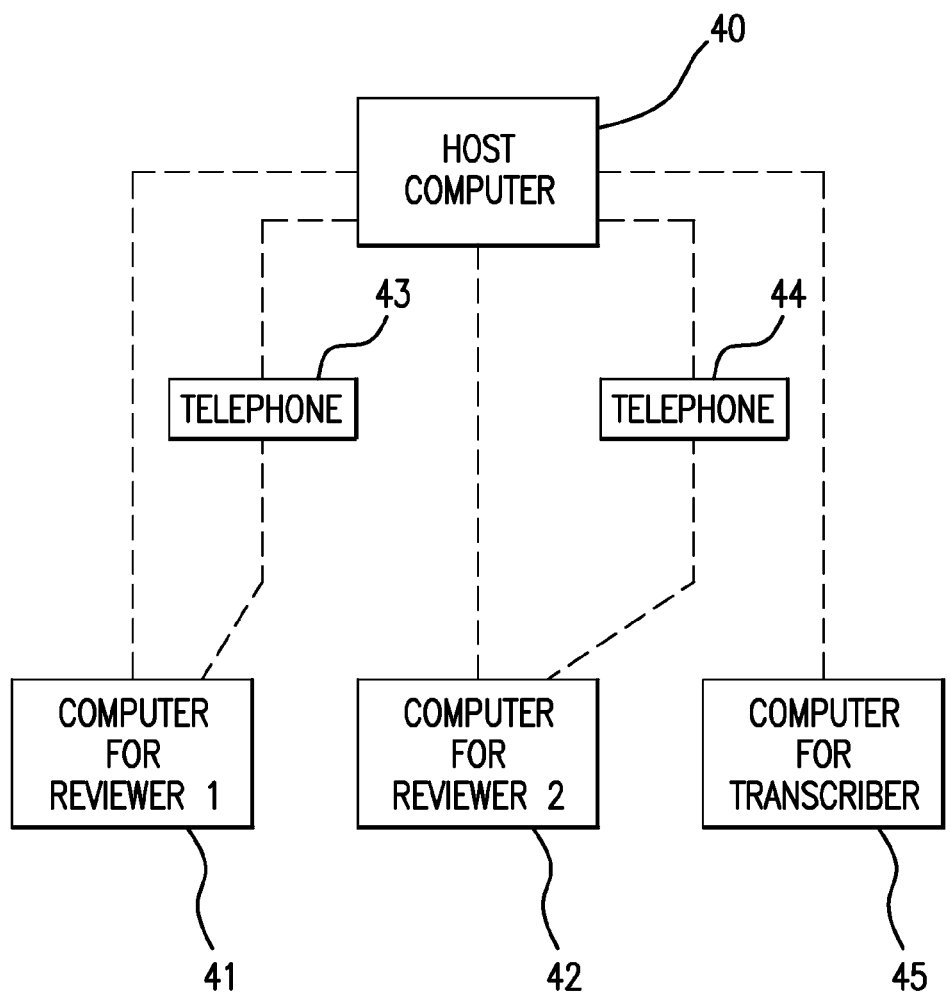
FIG. 11 provides a block diagram showing the components of the system of the present invention.

FIG. 11 provides a block diagram illustrating the major components of the system of the present invention. FIG. 11 applies to both of the embodiments described above. The system is implemented on host computer 40, which communicates by a network connection (such as an Internet connection) with computers 41 and 42 associated with reviewers. For simplicity, the computers of only two reviewers are shown, but in practice, there may be many more such computers. The computers of the reviewers may also be connected by telephone; FIG. 11 shows telephone 43 associated with computer 41, and telephone 44 associated with computer 42. The telephones could be implemented directly by the computers, i.e. using known VOIP technology, and in such case, the invention could be practiced without a separate telephone connection to the host computer. That is, a single Internet connection between the host and the reviewers would suffice to provide the telephone link.

Computer 45 represents the computer associated with one of the transcribers. For simplicity, only one transcriber is represented, but in general, there may be many transcribers.

Host computer 40 also comprises means for notifying the reviewers of the existence of comments, made by other reviewers, to particular slides. That is, computer 40 is preferably programmed to send an email to each reviewer who has commented on a particular slide, the email containing a link to the comment or comments, to the same slide, submitted by other reviewers. Alternatively, computer 40 can be programmed to send an email to each reviewer who has reviewed a particular slide, each email containing a link to comments made, to the same slide, by other reviewers.

For the embodiment comprising the creation of audio or other non-textual comments to a slide kit, the host computer comprises a means for displaying the slides to the reviewer, and the means for accepting the audio comment (or other non-textual comment) from the reviewer, and for associating that comment with a selected slide. The host computer also comprises a means for posting a link, associated with a comment, to provide access to the comment by the reviewers.

The transmission of an audio comment can be accomplished by any of various technologies. The comment could be transmitted, as described above, by telephone, or by VOIP technology, or through a microphone directly connected to the reviewer's computer. All such alternatives are within the scope of the invention.

For the embodiment comprising the creation of a video, the host computer comprises the means for displaying the video, and for accepting comments from reviewers. The host computer also comprises means for posting such comments so as to make them available to all reviewers. The host computer also includes means for indicating which portions of the video has associated comments, including the provision of coded portions of a video navigation bar (such as shaded areas 28 and 29), and the alteration of an attribute of the video itself (such as the tinting of portion of the video having associated comments). The host computer also comprises means for notifying reviewers of comments made by other reviewers, as described above.

The invention can be further modified in ways which will be apparent to the reader skilled in the art. Such modifications should be considered within the spirit and scope of the following claims.

What is claimed is:

1. A method comprising:
    a host computer establishing a first network connection between the host computer and a first device associated with a first reviewer to make a slide kit electronically accessible to the first reviewer;
    the host computer requesting, through the first device, confirmation from the first reviewer that the first reviewer desires to be contacted by the host computer through a second device also associated with the first reviewer, the second device being different than the first device;
    the host computer establishing a second network connection between the host computer and the second device by placing a telephone call to the second device;
    the host computer receiving an input that includes an audio comment from the second device via the second network connection, the audio comment being associated with a slide included in the slide kit;
    the host computer storing the input; and
    the host computer providing a link to the input, the link accessible through contact with the host computer, for access by a device associated with a second reviewer.

2. The method of claim 1, wherein receiving an input that includes an audio comment includes receiving a telephonic comment.

3. The method of claim 1, further comprising, prior to the host computer placing the telephone call to the second device, the host computer verifying, with the first reviewer, a previously stored telephone number associated with the first reviewer.

4. The method of claim 1, further comprising making the audio comment accessible to a computer associated with a transcriber for transcribing the audio comment to produce a textual version of the audio comment.

5. The method of claim 4, further comprising the host computer receiving the textual version of the audio comment.

6. The method of claim 5, further comprising the host computer making the textual version of the audio comment available to the device associated with the second reviewer.

7. The method of claim 1, further comprising the host computer sending a notification to a device associated with the second reviewer regarding the existence of the audio comment received from the second device.

8. The method of claim 1, further comprising the host computer sending a notification to a device associated with a third reviewer who has previously commented on the slide regarding the existence of the audio comment received from the second device, the notification including a link to the audio comment received from the second device.

9. The method of claim 1, further comprising the host computer sending a notification to a device associated with a third reviewer who has reviewed the slide regarding the existence of the audio comment received from the second device, the notification including a link to the audio comment received from the second device.

10. The method of claim 1, wherein the input that includes an audio comment comprises a first non-textual comment, the method further comprising the host computer receiving a second non-textual comment, the second non-textual comment comprising one or more of: an audio file, an image file, a video file, or a multimedia file.

11. The method of claim 1, wherein the input that includes an audio comment comprises a first input that includes a first audio comment, the method further comprising receiving a second input that includes a second audio comment from the second reviewer device and embedding the second audio comment into the first audio comment between a beginning and ending of the first audio comment.

12. The method of claim 11, wherein embedding the second audio comment into the first audio comment between a beginning and ending of the first audio comment comprises:
    splitting the first audio comment into first and second segments such that during playback of the first audio comment and embedded second audio comment, the first segment of the first audio comment is played, followed by the second audio comment, followed by the second segment of the first audio comment; or
    creating a single audio file including the first audio comment and the second audio comment arranged between the beginning and ending of the first audio comment.

13. The method of claim 1, further comprising the host computer providing the first device with one or more online audio editing features for editing the audio comment and a plurality of audio control buttons for navigating through the audio comment, the plurality of audio control buttons including a fast forward button and a rewind button.

14. The method of claim 1, wherein each of the first and second devices comprises at least one of a computer, a microphone, or a telephone.

15. The method of claim 1, further comprising receiving, from the first device, an indication that the first reviewer desires to be called using a different telephone number than a previously stored telephone number of the first reviewer, wherein the host computer places the telephone call to the second device using the different telephone number.

16. A method comprising:
a host computer receiving a non-textual comment from a first device associated with a first reviewer, said non-textual comment being associated with a portion of a video, the video being accessed via the host computer,
the host computer providing access to said non-textual comment to a second device associated with a second reviewer,
the host computer receiving a transcription of the non-textual comment,
the host computer making the transcription of the non-textual comment available for access by the second device; and
the host computer sending a notification to a device associated with the second reviewer regarding the existence of the non-textual comment received from the first device without the second reviewer accessing the video to receive the notification.

17. The method of claim 16, further comprising the host computer providing a video navigation bar for navigating through the video.

18. The method of claim 17, further comprising the host computer coding portions of the video navigation bar to indicate portions of the video with which comments have been associated.

19. The method of claim 18, further comprising the host computer coding a first portion of the video navigation bar differently than a second portion of the video navigation bar to indicate that a different number of comments are associated with the first portion of the video navigation bar than with the second portion of the video navigation bar.

20. The method of claim 17, further comprising the host computer varying an attribute of a video display to indicate portions of the video with which comments have been associated, the video display including a central display area wherein the video is rendered, and wherein varying an attribute of the video display includes varying an attribute of the central display area.

21. The method of claim 16, further comprising the host computer providing access to one or more key frames of the video, such that selection of a key frame causes a scene that includes the selected key frame to be played by the host computer.

22. The method of claim 21, wherein the key frames comprise:
a representative frame from each scene of the video, or
a frame from each scene of the video with which comments have been associated.

23. The method of claim 16, wherein the non-textual comment comprises an audio comment, the method further comprising receiving a subsequent non-textual comment, the subsequent non-textual comment comprising one or more of: an audio file, an image file, a video file, or a multimedia file.

24. A system comprising:
means for providing access to a slide kit to a first device associated with a first reviewer, the slide kit being stored on a host computer;
means for requesting, through the first device, confirmation from the first reviewer that the first reviewer desires to be contacted by the host computer through a second device also associated with the first reviewer, the second device being different than the first device;
means for establishing a network connection between the second device and the host computer by placing a telephone call from the host computer to the second device;
means for accepting a non-textual comment from the second device via the network connection, the non-textual comment being associated with a selected slide included in the slide kit; and
means for posting a link to the non-textual comment on the host computer for access by a device associated with a second reviewer.

25. The system of claim 24, further comprising means for notifying the second reviewer of the existence of the non-textual comment made by the first reviewer with respect to the selected slide.

26. A system comprising:
means for displaying a video on a host computer, said video being accessible through contact with the host computer,
means for accepting an input including an audio comment from a first device associated with a first reviewer, said audio comment being associated with a portion of the video,
means for posting said audio comment on the host computer so as to make the audio comment accessible to a second device associated with a second reviewer,
means for receiving a transcription of the audio comment,
means for making the transcription of the audio comment available to other reviewers; and
means for sending a notification to a device associated with the second reviewer regarding the existence of the audio comment received from the first device without the second reviewer accessing the video to receive the notification.

27. The system of claim 26, wherein the means for displaying includes means for indicating portions of the video with which comments have been associated.

28. The system of claim 27, wherein the means for indicating is selected from the group consisting of
means for coding a part of a video navigation bar to indicate portions of the video with which comments are associated, and
means for varying an attribute of the video to indicate portions of the video associated with comments.

29. The system of claim 26, wherein the means for displaying comprises means for displaying key frames of the video, and means for displaying portions of the video in response to selection of one of said key frames.

30. The system of claim 26, further comprising means for notifying the second reviewer of the existence of the audio comment.

31. An article of manufacture including a computer-readable medium comprising instructions for:
making a slide kit electronically accessible to a first device associated with a first reviewer;
requesting, through the first device, confirmation from the first reviewer that the first reviewer desires to be contacted by a host computer through a second device also associated with the first reviewer, the second device being different than the first device;
establishing a network connection between the host computer and the second device by placing a telephone call from the host computer to the second device;
receiving an audio comment from the second device via the network connection, the audio comment being associated with a slide included in the slide kit;
storing the audio comment; and
providing a link to the audio comment for access by a device associated with a second reviewer.

32. An article of manufacture including a computer-readable medium comprising instructions for:
making a video electronically accessible to a first device associated with a first reviewer;
receiving a non-textual comment from the first device, the non-textual comment being associated with a portion of the video;
providing access to the non-textual comment to a second device associated with a second reviewer;
receiving a transcription of the non-textual comment;
providing access to the transcription of the non-textual comment to the second device; and
sending a notification to a device associated with the second reviewer regarding the existence of the non-textual comment received from the first device without the second reviewer accessing the video to receive the notification.

33. An apparatus comprising:
a communication interface configured to communicate with a network;
a computer operably connected to the communication interface and configured to execute computer executable instructions; and
a memory operably connected to the computer, the memory having instructions stored thereon for:
making a slide kit electronically accessible to a first device associated with a first reviewer;
requesting, through the first device, confirmation from the first reviewer that the first reviewer desires to be contacted by a host computer through a second device also associated with the first reviewer, the second device being different than the first device;
establishing a network connection between the host computer and the second device by placing a telephone call from the host computer to the second device;
receiving an audio comment from the second device via the network connection, the audio comment being associated with a slide included in the slide kit;
storing the audio comment; and
providing a link to the audio comment for access by a device associated with a second reviewer.

34. An apparatus comprising:
a communication interface configured to communicate with a network;
a computer operably connected to the communication interface and configured to execute computer executable instructions; and
a memory operably connected to the computer, the memory having instructions stored thereon for:
making a video electronically accessible to a first device associated with a first reviewer;
receiving a non-textual comment from the first device, the non-textual comment being associated with a portion of the video;
providing access to the non-textual comment to a second device associated with a second reviewer;
receiving a transcription of the non-textual comment;
providing access to the transcription of the non-textual comment to the second device; and
sending a notification to a device associated with the second reviewer regarding the existence of the non-textual comment received from the first device without the second reviewer accessing the video to receive the notification.

* * * * *

UNITED STATES PATENT AND TRADEMARK OFFICE
CERTIFICATE OF CORRECTION

PATENT NO. : 7,934,160 B2  
APPLICATION NO. : 11/779982  
DATED : April 26, 2011  
INVENTOR(S) : Bono et al.

Page 1 of 1

It is certified that error appears in the above-identified patent and that said Letters Patent is hereby corrected as shown below:

Column 9, line 55, in Claim 1, delete "method" and insert -- method, --.

Column 12, line 48, in Claim 28, delete "of" and insert -- of: --.

Signed and Sealed this
Thirteenth Day of September, 2011

David J. Kappos
*Director of the United States Patent and Trademark Office*